3,331,759
METHOD OF MANUFACTURING A SOLID ELECTROLYTIC CAPACITOR USING AN ALKALI METAL BIPHTHALATE
Abraham Middelhoek, Arend van Herwijnen, and Siebren van der Wal, all of Centuurbaan, Zwolle, Netherlands, assignors to North American Philips Company, Inc., New York, N.Y., a corporation of Delaware
No Drawing. Filed June 4, 1964, Ser. No. 372,691
Claims priority, application Netherlands, June 21, 1963, 294,448
2 Claims. (Cl. 204—38)

The invention relates to a method of manufacturing a solid electrolytic capacitor which comprises an anode which consists of a porous member of sintered aluminum powder.

Such an electrolytic capacitor is known and is manufactured after forming the anode member consisting of compressed and sintered aluminum powder on the surface of which anode member an aluminum oxide layer is obtained which serves as a dielectric, by providing on said aluminum oxide layer a solid semi-conductor metal oxide, providing thereon a layer of material having a high electric conductivity and incorporating the assembly in a housing. The layer of the solid semi-conductor metal oxide is deposited on the dielectric oxide layer by impregnating the formed anode member with a salt of the metal in question which is derived from an oxyen-containing acid, drying the thus impregnated anode member at a pressure of maximally 10 mm. of Hg and then heating at a temperature at which the semi-conductor metal oxide is formed by pyrolysis. In the case where the semi-conductor compound is $MnO_2$, impregnation is carried out with a solution of manganese nitrate and heating is carried out at a temperature of from 250 to 300° C. after drying in vacuo. According to another known method it is also possible to provide the layer of the semi-conductor metal oxide by heating the impregnated anode member at a high temperature for a short period of time without drying the anode member beforehand. For manufacturing a layer consisting of $MnO_2$, heating is then effected at a temperature of approximately 450° C. The latter method, however, is more critical than the former and can easily give rise to rejects if care is not taken that the impregnated anode members very rapidly reach the required high temperature.

The embodiment in which an anode member consisting of sintered powder is used is more attractive when the smallest possible dimensions of the capacitor with a certain capacity value are desired. As compared with a wound foil capacitor, this embodiment has a more favourable value of the capacity per unit by value.

However, it has been found that during the formation of such an anode member which is sintered and compressed from aluminum powder with the forming electrolyte normally used for Al, specific difficulties occurred as a result of which a capacitor with usable electric properties could not be obtained. These forming electrolytes which are excellently suitable for the manufacture of the solid wound Al foil capacitor, are, for example, aqueous electrolytes with boric acid and borax or electrolytes containing glycol with boric acid and ammonia. Inadmissibly high leakage currents, high losses, low capacities or combination hereof were obtained.

The invention provides a forming electrolyte for an anode member consisting of compressed and sintered aluminum powder, with which it is possible to manufacture a solid electrolytic capacitor with excellent dielectric properties.

The method according to the invention is characterized in that both the initial forming and the post-forming are carried out in an electrolyte consisting of aqueous solution of an alkali biphthalate which contains from 0.5 to 5% by weight of this compound.

In order that the invention may readily be carried into effect, it will now be described more fully, by way of example, with reference to the specific examples.

(1) Aluminum powder having a particle size between 5 and 50 microns and a purity of 99.9% of Al was mixed with 6% by weight of naphthalene. Of this mixture lozenges having a diameter of 3.4 mm. and a length of 5.4 mm. were compressed around an aluminum wire having a diameter of 0.5 mm. and a length of 30 mm. These lozenges were sintered for one hour at a temperature of 655° C. at a pressure of from $10-20\times10^{-5}$ mm. of Hg. A part of the lozenges was formed according to the invention at 25 volts in an electrolyte consisting of a 0.25% solution of potassium biphthalate in water (1). This electrolyte has a resistivity of 850 ohm/cm. and a pH of 4.2. For comparison equal quantities of lozenges were each formed in one of the following electrolytes:

(2) 0.1% of citric acid in water (specific resistance 1500 ohm/cm. and pH=2.2).

(3) 3.84% of $H_3BO_3$+0.01% of $NH_4OH$ in water (specific resistance 5000 ohm/cm. and pH=5).

(4) 2% of boric acid+borax to pH=6 in water (specific resistance 1800 ohm/cm.).

The formed lozenges were impregnated with a solution of $Mn(NO_3)_2.4H_2O$ in its own crystal water and then heated for one minute at 450° C. and postformed at 21 volts in the same electrolyte solution. Impregnation and postformation were carried out totally three times. After forming and after each postforming the lozenges were thoroughly rinsed in de-ionized water and dried at a temperature of approximately 70° C. The lozenges were then provided with a graphite layer by means of a suspension, on the layer a silver layer was provided by means of a silver-coating paste, connection wires were attached and the assembly was built into a housing.

In the table is stated the reject percentage of the capacitors which are formed with each of the above electrolytes and of the remaining number the average value of the leakage current measured at 10 volts, the capacity, the loss factor tangent delta and the impedance measured at a frequency of 100 kc./s. ($Z_{100\ kc.}$).

TABLE

| Forming electrolyte | 1 | 2 | 3 | 4 |
|---|---|---|---|---|
| Reject (percent) | 15 | 30 | 50 | 15 |
| Leakage current ($\mu A$) | 26 | 14 | 887 | 840 |
| Capacity ($\mu F$) | 13.1 | 3.3 | 10.9 | 5.1 |
| Tangent delta (percent) | 5.0 | 17.7 | 16.5 | 4.0 |
| $Z_{100\ kc.}$ (ohm) | 3.7 | 3.6 | 2.3 | 4.1 |

(2) Aluminum powder of the quality of the preceding example was mixed with 12% by weight of naphthalene and then lozenges having a diameter of 2.8 mm. and a length of 4.4 mm. were compressed around an Al-wire (Al 99.99%) having a diameter of +.5 mm. and a length of 30 mm. The quantity of powder per lozenge was 36 mg. The lozenges were sintered for one hour at a temperature of 655° C. and at a pressure of from $10-20\times10^{-5}$ mm. of Hg.

Forming and postforming took place at 21 volts in an electrolyte consisting of a 2½% by weight of aqueous solution of potassium biphthalate at room temperature. The resistivity of the forming solution was 100 ohm/cm., the pH approximately 4. After forming and postforming the lozenges were thoroughly rinsed in deionized water.

Impregnation took place in the same manner as in the preceding example; heating, for effecting pyrolysis of the manganese nitrate, took place at 450° C. for 45 seconds. Heating and postforming were carried out four times totally. Then a nickel wire was welded to the aluminum core wire, the lozenge was provided with a graphite layer by dipping three times in a graphite suspension and drying in between, the lozenge was silver-coated and built into a housing.

The resulting electrolytic capacitors had, on an average, a capacity of 11.3 μf., a leakage current, measured at the operating voltage of 6.4 volts, of 11.5 μa., a loss factor tangent delta of 8.2% and an impedance at 100 kc./s. of 8.1 ohms.

What is claimed is:

1. The method of manufacturing a solid electrolytic capacitor which method comprises, shaping an anode from a porous sintered aluminum powder, electrically forming a dielectric oxide layer on said anode in an aqueous solution of an alkali metal biphthalate, impregnating said oxide coated anode with a solution of a semiconductor metal and an oxygen acid, heating said impregnated anode to a temperature at which said metal salt is converted into an oxide thereby forming a solid semiconductor metal oxide layer on said dielectric oxide layer, then electrically postforming said anode in an aqueous solution of an alkali metal biphthalate, repeating the forming, impregnating, heating and postforming steps at least once and then coating said thus treated anode with a conductive metal layer.

2. A solid electrolytic capacitor manufactured according to claim 1.

References Cited

UNITED STATES PATENTS 3,227,639   1/1966   Kampert _____ 204—58

FOREIGN PATENTS 455,412   10/1936   Great Britain.

JOHN H. MACK, *Primary Examiner.*

W. VAN SISE, *Assistant Examiner.*